Figure 1:
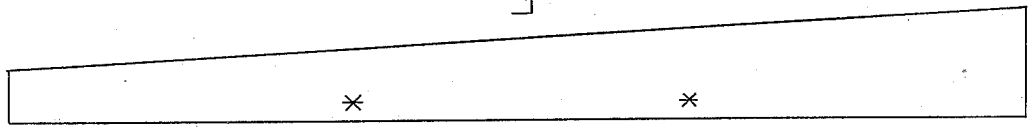

(No Model.) 3 Sheets—Sheet 1.

N. W. STEARNS & C. GRANT, Jr.
CASH AND PARCEL TRANSMITTING APPARATUS FOR STORE SERVICE.

No. 338,369. Patented Mar. 23, 1886.

WITNESSES.
E. E. Eaton
H. W. Stearns.

INVENTORS.
Norman W. Stearns
Charles Grant Jr.,
pr Norman W. Stearns,
Atty (No Model.) 3 Sheets—Sheet 2.
N. W. STEARNS & C. GRANT, Jr.
CASH AND PARCEL TRANSMITTING APPARATUS FOR STORE SERVICE.
No. 338,369. Patented Mar. 23, 1886.
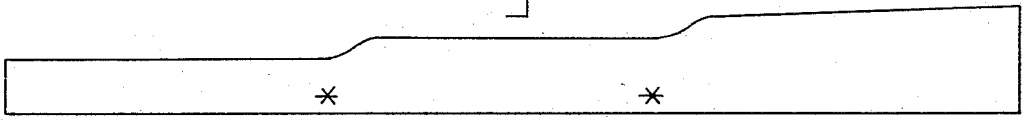
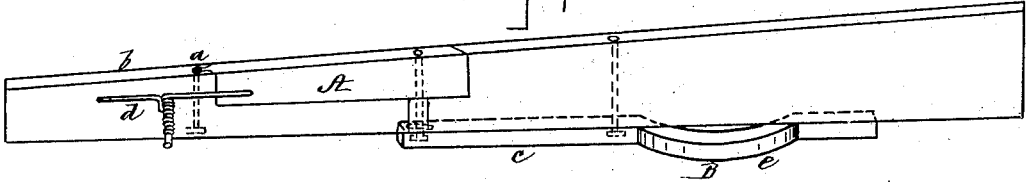
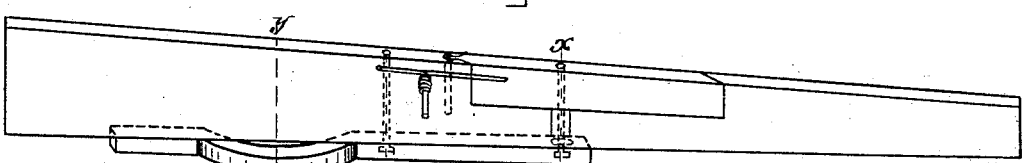
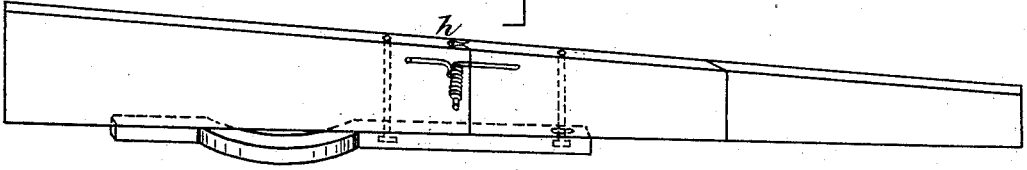
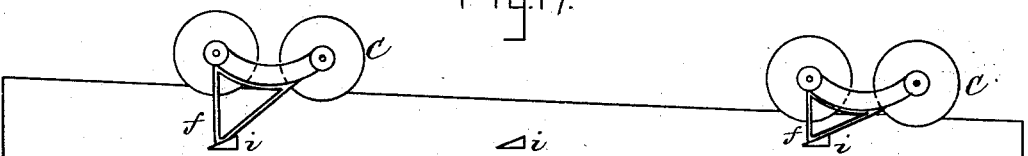
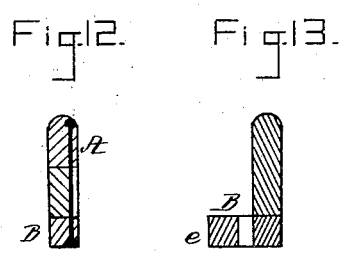
WITNESSES.
E. E. Eaton
H. W. Stearns
INVENTORS.
Norman W. Stearns
Charles Grant Jr.,
pr Norman W. Stearns,
Atty.

(No Model.) 3 Sheets—Sheet 3.
N. W. STEARNS & C. GRANT, Jr.
CASH AND PARCEL TRANSMITTING APPARATUS FOR STORE SERVICE.
No. 338,369. Patented Mar. 23, 1886.
Fig. 14.
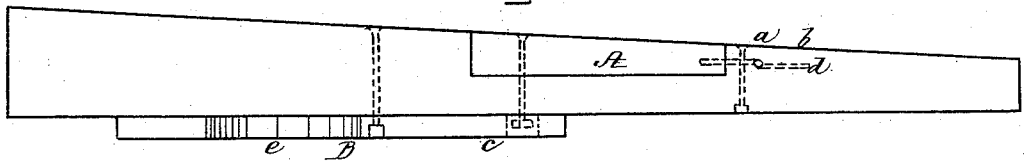
Fig. 15.
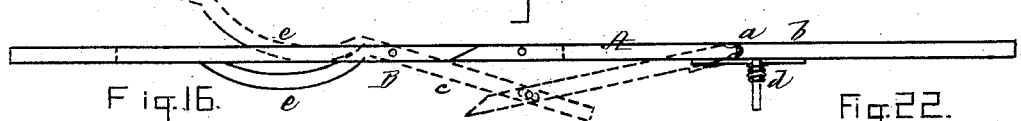
Fig. 16.
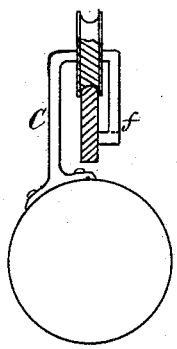
Fig. 20.
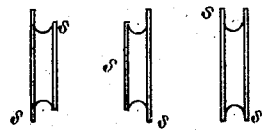
Fig. 22.
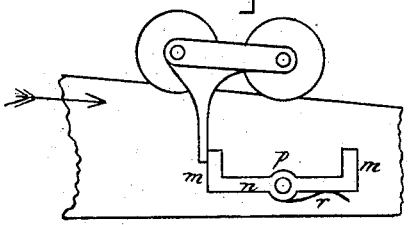
Fig. 21.
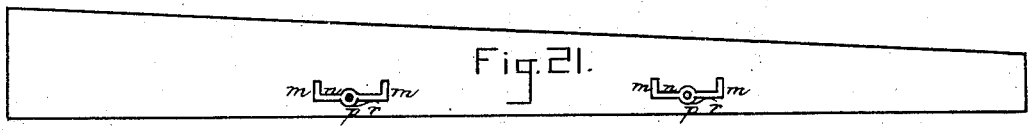
Fig. 18.
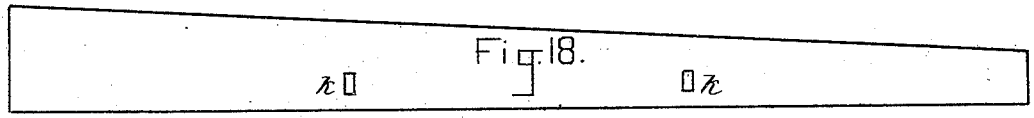
Fig. 19.
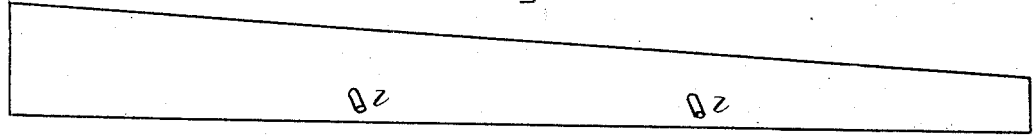
WITNESSES
E. E. Eaton
H. W. Stearns
INVENTORS.
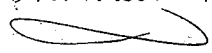
Norman W. Stearns
Charles Grant Jr.,
pr Norman W. Stearns
Atty.

UNITED STATES PATENT OFFICE.

NORMAN W. STEARNS AND CHARLES GRANT, JR., OF BOSTON, MASS.

CASH AND PARCEL TRANSMITTING APPARATUS FOR STORE-SERVICE.

SPECIFICATION forming part of Letters Patent No. 338,369, dated March 23, 1886.

Application filed January 18, 1886. Serial No. 188,863. (No model.)

*To all whom it may concern:*

Be it known that we, NORMAN W. STEARNS and CHARLES GRANT, Jr., both of Boston, in the county of Suffolk and State of Massachusetts, have invented certain Improvements in Cash and Parcel Transmitting Apparatus for Store-Service, &c., of which the following is a full, clear, and exact description, reference being had to the accompanying drawings, making part of this specification, in which—

Figures 1, 2, 3, 4, 5, 6, 7, and 8 illustrate different forms of our track. Fig. 9 represents one of the above referred to forms of graduated or inclined single-rail tracks, with a portion of the same cut away to receive a pivoted section of the track, and also representing one of a series of non-graduated devices connected with said pivoted section, to be operated only by a graduated carrier belonging to the station where said section is located, in order that the pivoted section may be swung by the carrier corresponding thereto (before its arrival thereat) away from its normal position out of line with the contiguous stationary portions of the track, whereby the carrier or carriers of this station only may be derailed thereat. Fig. 10 represents, also, one of the foregoing referred to tracks—*i. e.*, single-rail inclined track—with one of the aforesaid non-graduated devices connected therewith, and with a track-section pivoted to the upper instead of to the lower contiguous portion of the track. Fig. 11 represents the track-section of a station, formed by cutting through the track from top to bottom—*i. e.*, through its whole depth. Fig. 12 is a transverse section on the line *x x* of Fig. 10. Fig. 13 is a transverse section on the line *y y* of Fig. 10. Fig. 14 is an elevation of the opposite side of the track and its connections. (Shown in Fig. 9.) Fig. 15 is a plan of the same; Fig. 16, a section of one of our graduated carriers. Fig. 17 represents in elevation an inclined track constructed in accordance with one of the forms of our invention, with rigid non-graduated devices located at three stations, and with two of our graduated carriers arrested at the stations to which they belong. Fig. 18 represents another form of fixed non-graduated track device. Fig. 19 represents a track of our construction with two other non-graduated devices applied thereto; Fig. 20, carrier-wheels having graduated flanges; Figs. 21 and 22, another form of movable non-graduated track or station device.

Our invention has special reference to certain mechanism, devices, or means for arresting or stopping, and also certain mechanism, devices, or means for derailing, carriers at the station to which they respectively belong; and one of the prominent features of our invention consists in a track having its upper surface inclined and its lower surface so located as not to be parallel therewith, and having a series of movable non-graduated devices applied thereto for the passage on said track of a series of carriers provided with graduated devices which come into contact with and actuate the said non-graduated track devices, whereby the several carriers of a store-service system may be either automatically arrested or automatically derailed at the stations to which they respectively belong, according to the peculiar construction of the carrier employed.

And our invention also consists in a graduated inclined track—*i. e.*, a track having its upper surface composed of two or more inclines and its lower surface so located that the distance measured from any one point of an incline at one station vertically down to the lower surface of the track will not be the same as or correspond to a similar vertical measurement taken at any other station between the said upper and lower surfaces, this last-described feature also being necessarily associated with a series of non-graduated track devices and a series of graduated carriers, which, according to the class of carrier employed, may be either automatically stopped or automatically derailed at their respective stations.

And our invention also consists of a single-rail track whose upper surface is composed of inclined and horizontal portions, said track being provided with a series of non-graduated devices in combination with and struck by a series of graduated carriers.

And our invention also consists in a track composed of two rails, one located vertically or nearly vertically above the other, the upper surface of the upper rail having the whole or a portion thereof inclined, and the lower surface of the lower rail located in a line not parallel with an incline of the upper rail, the lower rail being provided with non-graduated devices, in combination with and acted on by a series of graduated carriers to insure the detention or derailment of each carrier at its proper station.

Our invention also consists in the combination with any of the tracks of the class described, having non-graduated devices, of a series of pivoted track-sections, each of which is so connected with its non-graduated track device that when the latter is actuated by the graduated carrier of the corresponding station the said track-section is swung out of line with the contiguous stationary portion of the track, in order that the carriers may run off said stationary portion into the opening formed thereby, and thus be derailed as desired, into any suitable receptacle located thereunder.

Our invention also consists in a series of permanently fixed or yielding non-graduated devices located at the several stations of and in combination with any of the aforesaid forms of inclined or graduated tracks for arresting the carriers belonging to the stations whereat said non-graduated devices are located.

Our invention also consists in a series of permanently fixed or yielding non-graduated devices, in combination with the class of inclined track herein referred to, and carriers so constructed as to be derailed by the said non-graduated devices located at the stations to which said carriers belong.

And our invention also consists in a series of carriers provided with graduated flanges, to come into contact with and to be operated by the non-graduated devices belonging to the stations of said class of tracks.

And our invention also consists in a series of carriers provided with graduated downwardly-extended arms or plates, in combination with and to be operated by a series of non-graduated devices connected or associated with a track of this class.

Figure 2:
Figure 3:
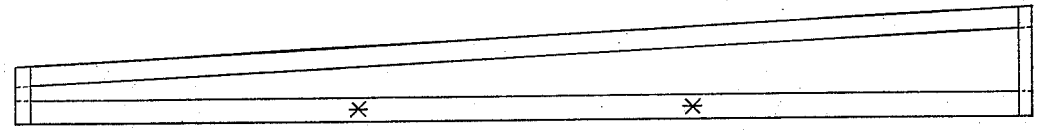
Figure 4:
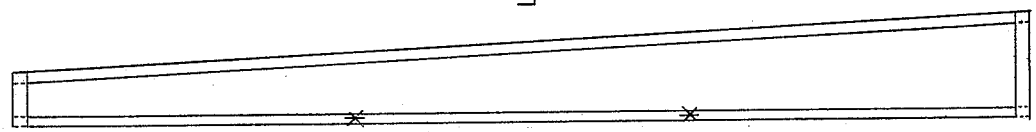
Figure 5:
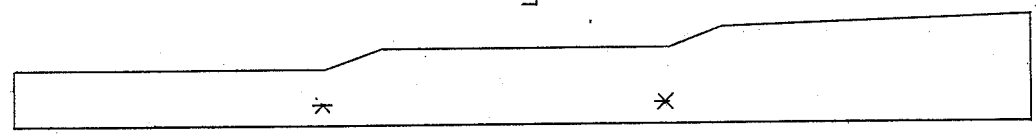
Figure 6:
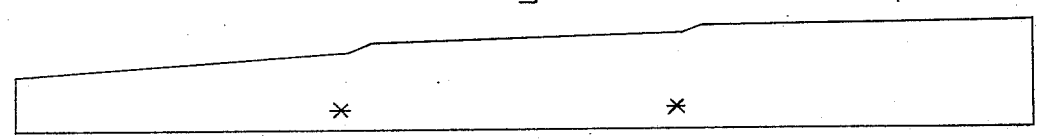
Figure 7:
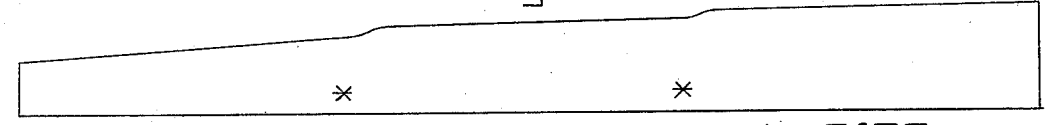

In the said drawings, Figs. 1 to 8, inclusive, illustrate various forms of inclined or graduated single-rail tracks which constitute the leading feature of this invention. In Fig. 1, the upper surface of the track is a continuous single incline from its upper to its lower end, the lower surface of the track being in a horizontal plane, from which construction it is apparent that no two vertical measurements between its upper and lower surfaces will be the same, the vertical distance from the bottom of the incline to the under side of the track being less than, and that at the top of the incline being greater than, any similarly-measured intermediate distance, which class of track enables us to employ a series of non-graduated devices in connection therewith—one for each station—that is to say, these devices are of precisely the same length, width, and depth, and of identically the same form and size. In Fig. 2, the upper surface of the track is represented as composed of a series of inclines, forming slight angles with each other—for instance, one incline for each salesman's station—said station being represented on the track by a star, (*,) which should be located at the counter of the store thereunder, but not here shown. In Fig. 3, the track is formed of two thin metal plates or ribbon-rails—one located above the other—the upper surface of the upper rail being continuously inclined from end to end and at the same angle to the lower rail, which is horizontal. In Fig. 4, the track is composed of two metal rods—one above the other—the upper rail being uniformly inclined from end to end at the necessary angle to the lower rail, which is horizontal. Fig. 5 represents a part of a track of flexible-ribbon metal having its upper surface formed of two long inclines and one horizontal portion connected by two short straight inclines, which are steeper than the long inclines, the under surface of this rail being horizontal. Figs. 6 and 7 represent a part of a track having its upper surface formed of long inclined and horizontal portions, connected by short curved inclines, the bottom of the rail being horizontal. Fig. 8 represents a part of a track having its upper surface formed entirely of horizontal portions connected by short inclines, its lower surface being horizontal. In Fig. 9 a portion of one of the tracks of the class illustrating our invention is represented as being cut through about one-half of its depth from its upper surface, and the track-section A thereby formed is pivoted, at $a$, to the contiguous stationary portion $b$ of the track below it. The upper end of this track-section, though free from its contiguous portion of the track, is pivotally connected with one of our non-graduated arms, B, which is preferably pivoted to the under side of the track, and has its straight portion $c$ located in the same plane vertically thereunder.

The track-section A is kept in its normal position by a torsional spring, $d$, in line with the stationary portions of the track. The said pivoted arm B is curved at $e$, and this curved portion projects to one side (outside) of one of the faces of the track sufficiently far to always remain in its normal position in the path of the device $f$ of the carrier C, Figs. 16 and 17, which belongs to and is to be derailed at the station where said arm or track device and its track-section are located. Immediately before the front wheel of the carrier of this station arrives at the free end of the track-section, the graduated carrier device $f$, projecting down from the carrier-frame behind it, passes into contact with the outside of the curved portion $e$ of the non-graduated arm, and, sliding against its surface, causes it to yield and swing in under the track, and simultaneously therewith the free end of the track section to which said arm is connected swings out of line with the contiguous stationary portions of the track, and the forward wheel of the carrier on reaching the opening formed thereby leaves the stationary portion of the track and causes the carrier to fall thereinto, and be deposited into any suitable receiver located thereunder, and immediately thereafter the track-section is returned by its spring to its original closed position, and the arm pivoted thereto is swung laterally back thereby under the track with its curved portion $e$ in the path of the next carrier which belongs to the same station. The carriers which belong to stations beyond having devices of less length than that of this station, pass by without coming into contact with or actuating the arm B, located thereat.

The arms B are non-graduated devices, for the reason that all of them are precisely of the same length, depth, width, and form, and each arm is located at the under side of the track at the same relative distance therefrom. These arms may, however, be located within recesses formed in the side or bottom of the track, (see Fig. 12,) and answer the desired purpose, provided that the distance from the top of one curved portion $e$ to the plane of the bottom of the track at one station exactly corresponds to that of a similar distance at any other station.

By any one of the forms of track which embrace or embody the feature of our invention herein described—to wit, a graduated track or graduated inclined track in connection with the location at the stations of the non-graduated arms or devices B—it will be readily understood that although said arms are all of identical size and form and are located at the same relative distance from the bottom of the track, their distances relative to the upper surface of the track at the different stations must necessarily be different, the distance from the top of the incline to the arm thereunder of the first station of a return-way being greater than the corresponding distance at the next station, and the distance at the next station still less, until at the last station said distance between the non-graduated arm and the point of the upper surface of the track immediately thereover will be the shortest.

With a track possessing the peculiarities of construction which forms the prominent feature of our invention and with a series of non-graduated devices attached thereto or to other objects located at the carrier-stations, we necessarily associate a series of carriers having devices of special lengths for the stations at which they are to be derailed, in order that the non-graduated track or station devices may coact therewith and effect the desired end—viz., the derailment of the carriers at their respective stations.

The graduated devices of the carriers are arranged as follows: The carrier having the longest device $f$ comes into contact with the non-graduated station or track device located at the first or upper station of the return-way. The device of the carrier belonging to the next station below being shorter, passes by without contact therewith, but comes into contact with the non-graduated device belonging to the next station.

In Fig. 11 the track-section is cut entirely through the track from its upper to its lower surface, and is to be pivoted to the stationary portion of the track at $h$, the free end of said section being farther removed from the end of its connecting-arm than its pivoted end.

Instead of pivoted non-graduated devices attached to the track or to objects located at its stations and adapted to be moved by carriers belonging to said stations, we intend to employ, when desirable, a series of fixed or rigid non-graduated station or track devices—as, for instance, such as those shown in Figs. 17, 18, 19—the same consisting of inclined projections $i$, secured to or formed integral with the track, and preferably extending from its side, Fig. 17; or said fixed non-graduated devices may consist of short vertical projections $k$, of the same length and width for each station, Fig. 18, or pins or projections $l$, extending out from the track, Fig. 19, of uniform size and form, respectively.

Non-graduated devices similar to that shown in Figs. 21 and 22 may be employed in conjunction with a graduated or inclined track constructed in accordance with our invention and with a series of carriers provided with graduated devices of the form shown in said Figs. 21 and 22, or of any other form suited for the purpose, the non-graduated device here referred to being formed of two parallel or nearly parallel upright or nearly upright portions, $m\,m$, connected by a horizontal or nearly horizontal portion, $n$, pivoted at $p$ to the side of the track, and having a spring, $r$, to keep it in its normal position, or being weighted for this purpose, the size and form of said device at one station corresponding exactly with that of any other station, and the points where they are pivoted only varying in their distances from the upper surface of the track without varying their distances from the lower line of the same.

Carriers may be employed having graduated flanges $s$ on either side of their supporting-wheels, (see Fig. 20,) said flanges coacting with either the laterally or vertically swinging non-graduated arms B or $m\,n\,m$, (shown in Figs 9, 10, 21, and 22,) with the fixed non-graduated devices secured to the track, (shown in Figs. 17, 18, and 19,) one of the aforesaid forms of our invention being adapted for simply stopping a carrier at its station, should it be desired to simply stop it and remove the same by hand, and another to derail different carriers by the same construction of track and non-graduated devices when the carriers employed are so constructed that their axes and wheels are free to rotate in their bearings to cause the equilibrium of the carriers to be destroyed when their unlocking devices strike against the non-graduated track or station devices, said form of carrier being of the class described in United States Patent No. 318,719.

The form of our invention embodying the movable track-sections and non-graduated track devices connected therewith enables any ordinary carrier to be derailed at its station— i. e., a carrier in which its wheels are not adapted to swing out of their normal upright or working position.

I claim—

1. In a cash and parcel transmitting apparatus for store-service, &c., a track having the vertical distance between its upper and lower surfaces at one station different from that between said surfaces at another station, in combination with a series of non-graduated devices located at the stations—i. e., devices of unvarying size and form for all stations—and a series of carriers provided with graduated devices, in order that the carriers may be arrested or derailed thereby at their respective stations, according to the class of carrier employed.

2. A track having its upper surface inclined and its lower surface so located as not to be parallel therewith, and a series of non-graduated devices located at the several stations thereof, in combination with a series of carriers provided with graduated devices to come into contact with the non-graduated station devices, for the purposes described.

3. A track having its upper surface inclined and its lower surface horizontal, in combination with a series of non-graduated station devices and a series of carriers having graduated devices, each arranged to coact only with the non-graduated device located at the station to which the carrier belongs.

4. A track having its upper surface composed of two or more inclines and its lower surface so located that the distance measured from any point of an incline at one station vertically down to the lower surface of the track will not be the same as or correspond to a similar vertical measurement taken at another station, in combination with a series of non-graduated track or station devices and a series of graduated carriers, which, according to the class (of carrier) employed, may be either automatically stopped or automatically derailed at their respective stations.

5. A single-rail track whose upper surface is composed of inclined and horizontal portions, a series of non-graduated track devices, and a series of graduated carriers, which come into contact therewith, for the purpose specified.

6. A track composed of two rails—one located above the other—the upper surface of the upper rail having the whole or a portion thereof inclined, and the lower surface of the lower rail located in a line not parallel with an incline of the upper rail, in combination with non-graduated devices located at the stations of the track, and a series of graduated carriers stopped or derailed thereby, for the purpose set forth.

7. A graduated or inclined track of the class described, having located at a carrier-station a pivoted track-section and a non-graduated device connected therewith, in combination with and actuated by a graduated carrier belonging at said station, whereby said track-section is swung out of line with the contiguous stationary portions of the track, to permit of the derailment of the carrier, substantially as described.

8. A series of permanently-fixed non-graduated devices, in combination with a track of the class described, and carriers so constructed that the wheel or wheels of each carrier are capable of being swung automatically out of their upright normal position, in order that the carrier may be derailed at the station to which it belongs, substantially as specified.

9. A graduated or inclined track of the class described, having a carrier-station provided with a pivoted track-section and a non-graduated device pivoted to the track either thereunder or at its side, and pivoted to the track-section at or near its upper or contiguous end, said track-section being pivoted at its lower end to the track, in combination with a graduated carrier belonging to said station, for swinging the track-section out of line with the contiguous stationary portions of the track to permit of the derailment of the carrier.

10. A series of pivoted track-sections formed by cutting part way through the rail of a track of the class herein described, and a series of non-graduated arms connected therewith, in combination with a series of graduated carriers to be derailed at the stations where the track-sections are located, as specified.

11. A pivoted track-section formed by cutting through the rail of a track of the class described from the top to the bottom thereof, in combination with one of a series of non-graduated track devices and one of a series of graduated carriers coacting therewith.

12. A graduated or inclined track embodying the feature of our herein-described invention, a series of non-graduated devices, $m\ n\ m$, pivoted thereto or to the track-supports or other objects located at the stations, in combination with a series of graduated carriers belonging thereat, for the purpose set forth.

13. A graduated or inclined track embodying the feature of our herein-described invention, a series of non-graduated devices, $m\ n\ m$, pivoted thereto or to the track-supports or other objects located at the stations, in combination with a series of wheel-carriers having graduated devices $f$ or flanges $s$, for the purpose described.

14. A graduated or inclined track embodying the feature of our invention herein described, a series of fixed inclines, pins, projections, or other devices integral therewith or secured thereto or to the track-supports or other suitable objects located at the stations, in combination with a series of wheel-carriers having graduated flanges or other graduated devices, for the purpose specified.

Witness our hands this 12th day of January, 1886.

NORMAN W. STEARNS.
   CHARLES GRANT, JR.

In presence of—
 C. L. EATON,
 W. A. CRESSY.